United States Patent

Kaiser

[11] Patent Number: 5,170,564
[45] Date of Patent: Dec. 15, 1992

[54] SWINGING SAW

[75] Inventor: Hans Kaiser, Leuzigen, Switzerland

[73] Assignee: Scintilla AG, Solothurn, Switzerland

[21] Appl. No.: 621,262

[22] Filed: Dec. 3, 1990

[30] Foreign Application Priority Data

Jan. 24, 1990 [DE] Fed. Rep. of Germany ....... 4001996

[51] Int. Cl.$^5$ ............................................. B23D 49/00
[52] U.S. Cl. ........................................ 30/393; 83/776; 384/206
[58] Field of Search .......................... 30/393, 394, 392; 384/38, 906, 206, 208, 192; 83/747, 776, 647, 782

[56] References Cited

U.S. PATENT DOCUMENTS

| | | | |
|---|---|---|---|
| 2,421,685 | 6/1947 | Crot | 384/192 X |
| 2,455,166 | 11/1948 | Firth | 384/906 X |
| 3,942,251 | 3/1976 | Griffies et al. | 30/394 X |
| 4,238,884 | 12/1980 | Walton, II | 83/776 X |
| 4,693,009 | 9/1987 | Bone | 83/747 X |
| 4,840,498 | 6/1989 | Lichtfuss | 384/906 X |

FOREIGN PATENT DOCUMENTS

| | | | |
|---|---|---|---|
| 020016 | 12/1955 | Fed. Rep. of Germany | 384/206 |
| 26085 | 12/1902 | United Kingdom | 384/208 |

Primary Examiner—Frank T. Yost
Assistant Examiner—Clark F. Dexter
Attorney, Agent, or Firm—Michael J. Striker

[57] ABSTRACT

A swinging saw has a saw blade performing a working movement with a superimposed swinging movement, a displacement rod supporting the saw blade and performing a swinging movement, a displacement rod support having an opening opening through which the displacement rod is guided. The displacement rod is guided such that relative movement, or play, is provided between the guide and the displacement rod in the swinging plane while play is prevented in a plane transverse to the swinging plane.

7 Claims, 2 Drawing Sheets

SWINGING SAW

BACKGROUND OF THE INVENTION

The present invention relates generally to a swinging saw. More particularly, it relates to such a swinging saw in which a swinging or pendulum movement is superimposed on the working movement of its saw blade wherein the displacement rod which supports the saw blade and guides it in a swinging manner is guided in an opening of a displacement rod support with an increased play.

Swinging saws of the above mentioned general type are known in the art. One of such swinging saws formed as a compressed saw is disclosed, for example in the German document DE-OS 3,497,847. Its lower displacement rod support is supported in an arrested manner and therefore can follow the swinging movement of the displacement rod.

The elastic abutment is subjected to high wear. A further disadvantage of such a saw is that the displacement rod with the saw blade can move not only parallel but also can move in uncontrollable fashion transverse to the swinging plane. Resonance occurs in the lower displacement rod support and is directed opposite to the swinging movement so that the swinging stroke is reduced.

In another known swinging compass saw the lower displacement rod support is immovably arranged in the machine housing. For making possible the swinging of the displacement rod, the diameter of the opening of the lower displacement rod support is greater than the diameter of the displacement rod. This insures the desired longitudinal play, and at the same time leads to an undesired transverse play of the displacement rod. As a result the maximum transverse deviation can be as big as the maximum swinging stroke. Thereby a wider cutting passage is obtained than in compass saws without swinging stroke. As a result, this leads to a reduced efficiency and a higher energy consumption.

SUMMARY OF THE INVENTION

Accordingly, it is an object of the present invention to provide a swinging saw which avoids the disadvantages of the prior art.

In keeping with these objects and with others which will become apparent hereinafter, one feature of the present invention resides, briefly stated, in a swinging saw in which the displacement rod is guided with its swinging play in a transversely play-free manner.

When the swinging saw is designed in accordance with the present invention, the displacement rod performs an exactly oriented, uniform swinging movement during displacement movement, and the working quality is substantially increased. The abutment of the displacement rod support is nonsensitive to wear.

In accordance with another feature of the present invention, the lower displacement rod support is provided with an elongated opening.

The elongated opening extends in a longitudinal direction which is oriented parallel to the swinging plane.

The displacement rod support carries an outer guiding slot which is oriented in the longitudinal direction of the elongated opening and extends preferably parallel to the same.

Still another feature of the present invention is that a guiding pin extends in the guiding slot and limits the movement of the rod support.

The profile of the elongated opening is funnel-shaped, especially in its longitudinal direction at both sides of the opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
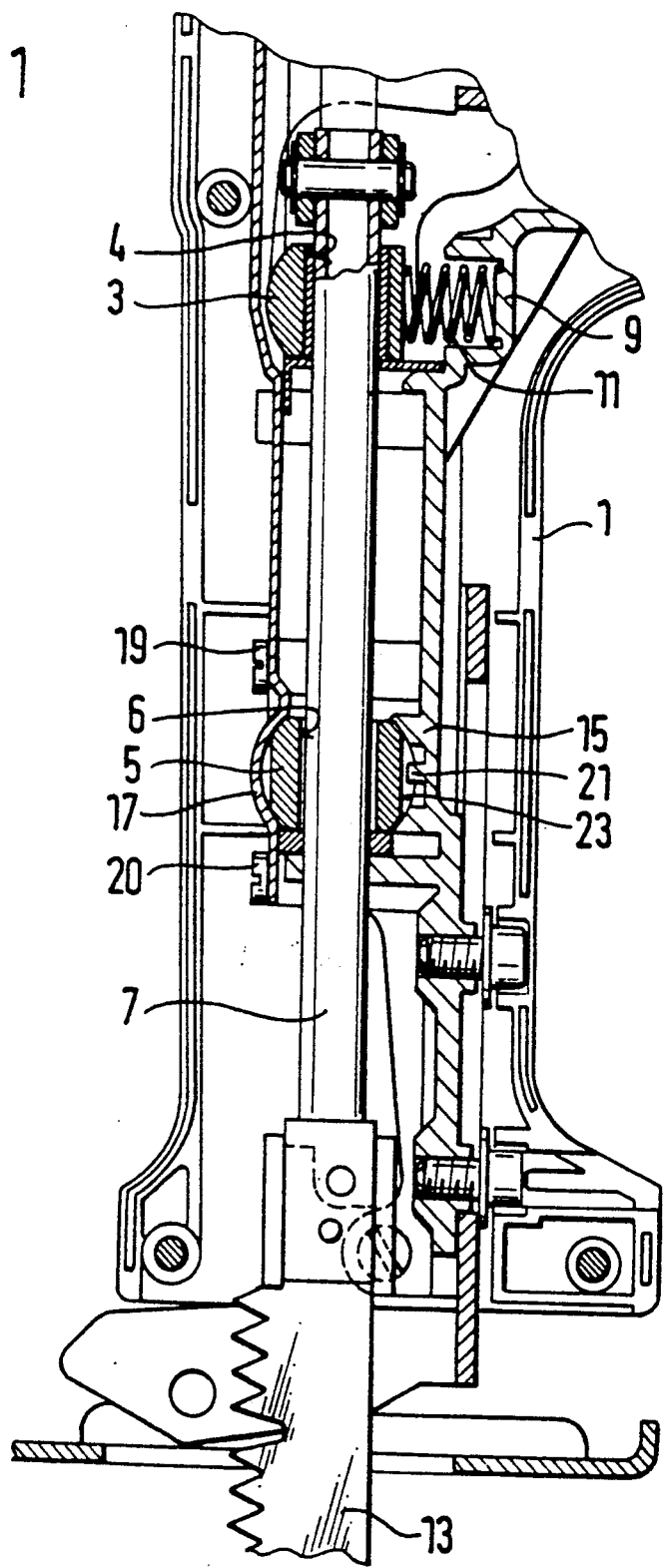
FIG. 1 is a view schematically showing a region of a swinging saw in accordance with the present invention.

A swinging saw shown in FIG. 1 has a housing which is identified with reference numeral 1. An upper displacement rod support 3 and a lower displacement rod support 5 are located in the housing. The upper displacement rod support 3 has a circular cylindrical opening 4 which forms an upper displacement rod guide for a displacement rod 7. The lower displacement rod support 5 has an elongated opening 6 which forms a lower displacement rod guide for the displacement rod 7 and has a major dimaeter and a minor diameter.

The upper displacement rod support 3 is supported normal to the longitudinal axis of the circular cylindrical opening 4 so as to move in a horizontal displacement direction. It is coupled with a swinging mechanical element 9 by a swinging spring 11. The displacement rod 7 carries a saw blade 13 on its free end.

The lower displacement rod support 5 can be turned relative to the housing and arrested in a desired position due to its outer spherical shape. Therefore, it can be adjusted in a favorable manner so that the longitudinal direction of the elongated opening 6 exactly extends in the swinging plane. The lower displacement rod support 5 is seated in a transmission housing 15. A cover 17 is held on the transmission housing 15 by two screws 19 and 20 and locates the lower displacement rod support 5 in its sitting position. A guiding pin 21 of the transmission housing 15 engages in a guiding slot 23 of the lower displacement rod support 5 at the side opposite to the cover 17.

Figure 2:
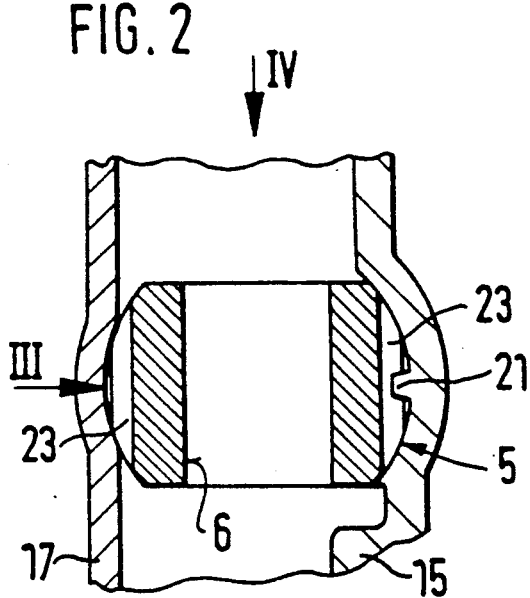
FIGS. 2 and 3 are views showing individual displacement rod supports of the inventive swinging saw.
Figure 3:
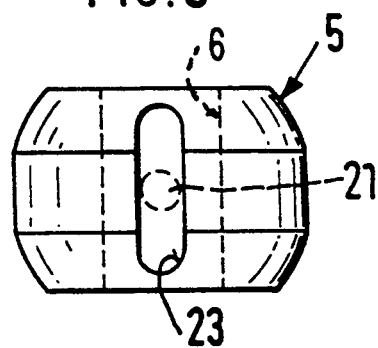

FIG. 2 shows the lower displacement rod support 5 without the displacement rod 7, as further described in FIG. 1. FIG. 3 is a view of FIG. 2 from direction III. FIGS. 2 and 3 show how a guiding pin 21 of a transmission housing 15 engages in one of the two guiding slots 23 of the lower displacement rod support 5. The guiding slots 23 are arranged so that they are in alignment with the longitudinal axis of the elongated opening 6.

Mounting position of the displacement rod support 5 is obtained due to the two guiding slots 23 which are milled or formed in a different way, and the guiding pin 21 which is provided in the transmission housing 15. The guiding pin 21 positions the guiding slots 23 and thereby the major diameter of the elongated opening 6 exactly in the swinging plane of the displacement rod 7. The extended axis of the guiding pin 21 passes through the center of the outer shape of the support 5. The doubled arrangement of the guiding slot 23 facilitates the mounting of the displacement rod support 5 relative to the guiding pin 21, since for producing the correct mounting position always two possibilities are provided, from which the desired position can be selected.

Figure 4:
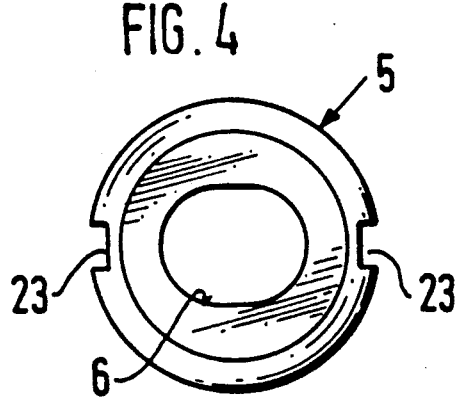
FIG. 4 shows a view of the first embodiment from the perspective of direction IV in FIG. 2.

FIG. 4 shows a plan view of the lower displacement rod support 5 in correspondence with FIGS. 2 and 3, from direction IV. It can be seen that the displacement rod guide is formed as an elongated opening 6. The elongated opening 6 operates on the end of its length as an abutment for limiting the swinging movement, and as a sliding surface of the sliding rod 7, whose center of rotation lies in the center of the elongated opening.

Figure 5:
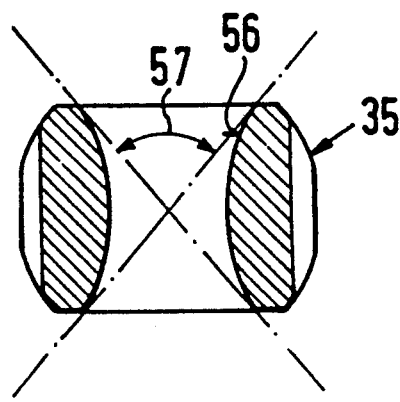
FIG. 5 show a transverse and a longitudinal section of a second embodiment of the lower displacement rod support.

FIG. 5 shows a further embodiment of FIG. 2. Here the elongated opening 56 of the lower displacement rod support 35 is expanded at both sides in a funnel-shaped manner. The funnel angle 57 in the section of the longitudinal extension is somewhat greater than the predetermined maximum turning angle of the displacement rod. Thereby, the displacement rod is guided in the lower displacement rod support 35 in its end positions on an especially large-surface and in a wear-resistant manner.

In the beginning of the operation of the swinging saw, the displacement rod 7 moves both in the vertical direction and also swingingly in a swinging plane fixed by the axis of the displacement rod 7 and the displacement direction provided through the upper displacement rod support. During the displacement, the upper part of the displacement rod 7 facing away from the saw blade 13 is concentrically engaged by the circularly cylindrical opening 4 of the displacement rod support 3 and guided in a play-free manner. The swinging movement is transmitted through the swinging mechanical element 9 and the swinging spring 11 to the upper displacement rod support 3 and thereby to a displacement region of the displacement rod 7.

The displacement rod 7 performs axial sliding reciprocating movements in the lower displacement rod support 5, 35 from the simultaneous reciprocating swinging or pendulum displacement about the center of rotation of the displacement rod 7 in the displacement direction. For this purpose, as mentioned above, the lower displacement rod guide is formed as the elongated opening 6, 56. It guides the displacement rod 7 in the direction of the major diameter of the elongated opening with a nominal play in a swinging or turning manner, but in a transverse play-free fashion without transverse play in the direction of the minor diameter of the elongated opening and transverse to the swinging plane. The displacement rod 7 can perform a predetermined swinging stroke without increasing the transverse play of the displacement rod 7 relative to the cutting channel produced by the saw blade 13 or contributing to the "running" of the saw blade 13. The cut is more accurate and either a faster displacement than with the conventional swinging saws is possible or operation with a lower displacement force than in conventional saws is possible. Moreover, the sensitivity of the swinging saws is improved. The greatest advantage is however that the saw blade 13 or the displacement rod 7 has a lower transverse play and thereby provides for a substantially better accuracy of the cut. In other words, a "running" of the saw blade 13 is made substantially more difficult.

The shown lower displacement rod support 5, 35 is suitable for compass saws, motorized fox saws and the like.

In accordance with a not shown embodiment of the invention, the lower displacement rod support is provided with a circular hole which allows for an increased play with the displacement rod. The transverse play of the displacement rod is hindered by mounting of exactly dimensioned, key-shaped sliding lamellas or the like on the sides of the opening transverse to the displacement direction.

It will be understood that each of the elements described above, or two or more together, may also find a useful application in other types of constructions differing from the types described above.

While the invention has been illustrated and described as embodied in a swinging saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A swinging saw, comprising a saw blade performing a longitudinally reciprocating working movement with a superimposed swinging movement; a displacement rod supporting said saw blade and performing said swinging movement in a swinging plane, said displacement rod having a predetermined circular cross-section; a displacement rod support having an elongated opening through which the displacement rod is guided, said elongated opening having a minor diameter extending transversely to said swinging plane and being substantially equal to the circular cross-section of the displacement rod and also having a major diameter extending parallel to said swinging plane and being greater than the circular cross-section of said displacement rod so as to allow said displacement rod to be guided in said displacement rod support with play in said swinging plane while preventing play transversely to said swinging plane.

2. A swinging saw as defined in claim 1, wherein said displacement rod support is a lower displacement rod support and is provided with said elongated opening.

3. A swinging saw as defined in claim 1, wherein said elongated opening extends parallel to said swinging plane.

4. A swinging saw as defined in claim 3, wherein said displacement rod support has an outer surface and an outer guiding slot provided in said outer surface and extending toward said elongated opening.

5. A swinging saw as defined in claim 4, wherein said elongated opening has a longitudinal direction extending through said opening, said guiding slot extending parallel to said longitudinal direction of said elongated opening.

6. A swinging saw as defined in claim 5, and further comprising a housing and a guiding pin provided in said housing, said guiding pin extending in said guiding slot and limiting the movement of said displacement rod support.

7. A swinging saw as defined in claim 6, wherein said elongated opening has two ends and has a profile which is funnel-shaped at both ends as considered in said longitudinal direction of said elongated opening.

* * * * *